United States Patent
Rodriguez

[11] Patent Number: 5,192,933
[45] Date of Patent: Mar. 9, 1993

[54] FIELD-ADJUSTABLE ULTRASONIC DETECTOR

[76] Inventor: Al W. Rodriguez, 33 Valencia St., Hauppauge, N.Y. 11788

[21] Appl. No.: 538,385

[22] Filed: Jun. 14, 1990

[51] Int. Cl.⁵ .............................. G08B 21/00
[52] U.S. Cl. .................... 340/621; 73/290 V; 367/908
[58] Field of Search ............... 340/621, 618; 367/93, 367/908; 73/290 V

[56] References Cited

U.S. PATENT DOCUMENTS

| | | |
|---|---|---|
| 3,047,850 | 7/1962 | Schmidt . |
| 3,362,009 | 1/1968 | Midlock . |
| 3,553,636 | 1/1971 | Baird .............................. 340/621 X |
| 3,622,957 | 11/1971 | Libengood . |
| 4,144,517 | 3/1979 | Baumoel . |
| 4,202,049 | 5/1980 | Wetzel ..................... 367/96 |
| 4,203,324 | 5/1980 | Baumoel ..................... 73/290 V |
| 4,248,087 | 2/1981 | Dennis et al. ................ 73/290 V |
| 4,280,126 | 7/1981 | White ............................. 340/621 |
| 4,316,183 | 2/1982 | Palmer et al. ................ 340/621 |
| 4,398,420 | 8/1983 | Haesen et al. . |
| 4,630,245 | 12/1986 | Dam ................................. 367/93 |
| 4,649,527 | 3/1987 | Forster et al. . |
| 4,853,694 | 8/1989 | Tomecek ........................ 340/621 |
| 4,901,245 | 2/1990 | Olson et al. ................... 364/509 |

Primary Examiner—Jin F. Ng
Assistant Examiner—Jeffery A. Hofsass

[57] ABSTRACT

A detector for detecting the presence or absence of an ultrasonically conductive medium such as a liquid within a container includes a transducer that generates and transmits an energy burst through a first wall of the container toward the opposing wall of the container. The frequency at which the energy burst is transmitted is selected so that the energy burst is greatly attenuated when it travels through air and is not greatly attenuated when it travels through liquid. The detector includes a window generator that generates an electronic window corresponding to a predetermined period of time during which the detector expects to receive an echo of the energy burst. If an echo is received during the window, then liquid is present in the container, whereas no liquid is present if no echo is received. The position of the window may be changed via a dial having discrete settings to accommodate pipes of different diameters. The frequency at which the energy burst is transmitted and the strength of the received echo signal may also be varied.

15 Claims, 4 Drawing Sheets

FIELD-ADJUSTABLE ULTRASONIC DETECTOR

BACKGROUND OF THE INVENTION

The present invention relates to an ultrasonic detector that detects whether an ultrasonically conductive medium such as a liquid is present in a container, the detector being field-adjustable to allow an operator in the field to adjust the detector without the need to utilize an oscilloscope or another electrical sensing device.

Conventional ultrasonic detectors may be used to detect the presence or absence of liquid in a container, such as a pipe for example. When used, such a detector is attached to the exterior wall of a pipe and senses whether liquid is present or absent in the pipe at the point of attachment.

The detector operates by transmitting a burst of energy through the pipe wall to which the detector is attached towards the opposite pipe wall. The burst of energy has a frequency such that the burst is greatly attenuated when it travels through air or another gas, but not greatly attenuated when it travels through liquid. The detector senses whether an echo of the transmitted burst of energy is received from the opposite pipe wall. If an echo is received, then the pipe is full of liquid at the point of attachment because the burst of energy was not greatly attenuated by the presence of air. If an echo is not received, the detector assumes that air is present since the energy burst was greatly attenuated.

The detector may generate an electronic window which controls the time during which the detector is responsive to the receipt of echoes. The purpose of the electronic window is to effectively filter out spurious echoes that are produced, for example, by travel of the burst of energy around the circumference of the pipe instead of directly through the pipe as intended. Such an electronic window would correspond generally to the time during which the detector expects an echo to be received from a point directly across the pipe.

A detector as described generally above is disclosed in U.S. Pat. No. 4,630,245 to Dam. While the operation of the Dam detector may be generally satisfactory, it suffers from the disadvantage that there is no easy manner in which to change the position of the electronic window to account for pipes of different sizes. In particular, the Dam detector uses a delay multivibrator that causes the position of the window to be predetermined. As a result, the Dam detector would require component changes to accommodate pipes of different diameters. Making such component changes would be tedious, time-consuming, and perhaps beyond the capability of operators in the field who may not be trained as electrical technicians.

Conventional ultrasonic detectors such as the Dam detector are also limited in their ability to accommodate various pipe sizes since they have no convenient manner of tuning them in the field, including adjusting the strength of the received echo signal or the frequency at which energy bursts are transmitted within the container.

U.S. Pat. No. 4,280,126 to White discloses a liquid level detector that determines whether liquid is present or absent at the point of attachment of the detector to a container. The detector utilizes an electronic window that is stated to be adjustable by a selector dial. A gain dial is adjusted to raise the amplitude at which the reception of reflected ultrasonic signals occurs. When the gain and selector dials are appropriately adjusted, an LED indicator is illuminated. However, there is no disclosure of the specific manner of operation of the White detector or that pipe size information is provided along with the selector dial.

According to one prior art detector tuning procedure, which was performed by the manufacturer of a detector, the detector was attached to a sample of pipe having the exact same dimensions and of the same material as the actual pipe to which the detector was to be eventually attached. The customer would typically provide the information about the pipe size and material to the manufacturer of the detector. The pipe sample was needed since the tuning of the detector was typically performed at a place other than the location of the actual pipe to which the detector was to be attached. This was necessary since such a conventional detector did not have any convenient manner of tuning it in the field.

During the tuning procedure, an oscilloscope or other electrical sensing device was attached to the detector, and the detector was tuned during operation in accordance with the visual display provided by the oscilloscope. The tuning included adjusting the frequency at which an energy burst was transmitted to increase and/or decrease the magnitude of the echo based on the visual display generated by the oscilloscope. The adjustment of the frequency was facilitated by a potentiometer.

The tuning procedure also included setting the magnitude of the echo signal received by the detector and setting the position of the window, based on the visual display provided by the oscilloscope. These two settings were accomplished by choosing and installing in the detector components, resistors for example, having certain specific values. These components were not installed in the detector prior to the tuning procedure. After the completion of tuning, the detector was then shipped to the customer and coupled to the actual pipe in the field for normal operation.

A significant problem occurred as a result of the tuning procedure described above. In a significant number of cases, the detector failed to operate properly when attached to the actual pipe in the field. It was discovered that one reason for this failure to operate was caused by material build-up on the interior of the pipe to which the detector was attached. The build-up of material on the interior of the pipe changed the transmission characteristics of the pipe. Another reason for the failure of the detector to operate properly was that the customer inadvertently provided erroneous information to the manufacturer concerning the actual pipe to which the detector was to be attached.

In either of the above cases, the detector had to be removed from the pipe, returned to the place where it was originally tuned, retuned, shipped back to the customer, and reattached to the actual pipe. Sometimes the detector was retuned in the field by the manufacturer's personnel with the use of an oscilloscope. The need to retune the detector was obviously cumbersome.

SUMMARY OF THE INVENTION

The present invention is directed to an ultrasonic detector that determines whether an ultrasonically conductive medium, such as a liquid, is present or absent in a container, the detector being field-adjustable to allow an operator in the field to adjust the detector without the need to utilize an oscilloscope or another electrical sensing device.

In one aspect, the invention is directed to a detector that detects the presence or absence of an ultrasonically conductive medium within a container. The detector includes a transducer that transmits a burst of energy through the container and a window generator that generates an electronic window associated with the travel time of the energy burst through the container. The detector also includes an echo detector that is responsive to an echo of the energy burst only during the time duration determined by the electronic window. A switch having a plurality of discrete settings is used to adjust the position of the electronic window to one of a plurality of different positions, each of the switch settings being based on a respective size of the container.

In one preferred embodiment of the invention, the switch for adjusting the position of the electronic window may be a rotary dial having a plurality of different pipe diameters provided on it. For example, the pipe diameters may range from one inch to nine inches in one-inch increments. When the detector is to be used with a pipe having a certain diameter, the operator simply positions the rotary dial to select the appropriate diameter. Thus, the detector is easily adjustable to accommodate a plurality of pipes or containers having different diameters, and the detector may be made portable so that one detector can be used to make a plurality of liquid-level determinations on many different pipes.

In another aspect, the invention is directed to a method of tuning a detector having an integral visual display wherein the frequency at which an energy burst is transmitted through a container is optimized. In accordance with the method, an energy burst is transmitted through the container and an echo of the energy burst is received. A visual display is provided integrally with the detector, and the visual display generates a visual indication relating to the magnitude of the echo. The frequency at which the energy burst is transmitted is adjusted, based on the magnitude of the echo as indicated by the visual display.

The capability of adjusting the frequency at which the energy burst is transmitted in response to the visual indication provided by the display allows the energy-burst frequency to be optimized, and such optimization may be conveniently performed by an operator in the field.

A transducer of the type usable in the present invention has one or more frequencies at which it most efficiently couples mechanical vibrations into the wall of a container. The adjustment of the energy-burst frequency to its optimal value in accordance with the invention allows efficient coupling of energy into a container wall without the coupling being so strong, however, so as to cause spurious echoes to have strong enough magnitudes to be received by the detector. For example, when the invention is used with metal pipes, spurious echoes would be made too strong by adjustment of the frequency to the most efficient frequency; consequently, the optimal frequency for metal pipes in accordance with the invention is slightly different than the most efficient frequency.

In a further aspect, the invention is directed to a method of tuning a detector having an integral visual display wherein the magnitude of the received echo signal is optimally adjusted. In accordance with this aspect of the invention, the magnitude of the received echo signal is adjusted, based on the visual display, to provide the strongest received echo signal that will not allow the detection of spurious echoes to be detected.

In a still further aspect, the invention is directed to a method of tuning a detector having an integral visual display wherein the position of the window is adjustable, the window position being adjusted based on the output of the visual display. This aspect of the invention provides a convenient manner of field-testing the detector based upon the position of the window without the need to know the specific structure of the pipe.

These and other features and advantages of the present invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

A detector in accordance with a preferred embodiment of the invention utilizes a transducer attached to the wall of a container to determine whether an ultrasonically conductive medium, such as liquid for example, is present or absent in the container. As used herein, the term "ultrasonically conductive medium" means any medium or substance, such as a liquid, solid, or semi-solid, through which energy bursts travel without being greatly attenuated, and the term "ultrasonically" does not imply any restriction as to the frequency at which the energy burst is transmitted.

Figure 1:
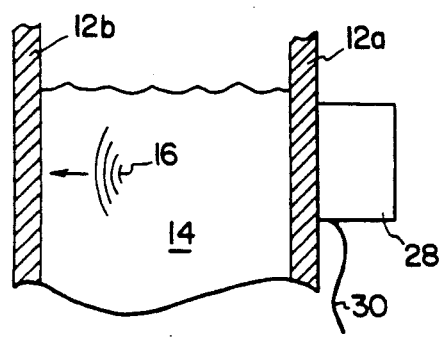
FIG. 1 is an elevational view, partly in section, of a transducer attached to a portion of a pipe.

FIG. 1 illustrates a transducer 28 attached to a first wall 12a of a pipe 12 having a second wall 12b opposed to the first wall 12a. The pipe 12 is shown to contain a liquid 14 having a level higher than the point of attachment of the transducer 28 to the pipe wall 12a.

The transducer 28 periodically transmits a burst of energy 16 through the pipe wall 12a towards the opposite pipe wall 12b. The frequency of the energy burst may be chosen so that the energy burst is greatly attenuated when it is transmitted through air or another gas, but not greatly attenuated when transmitted through a liquid, such as the liquid 14. Such a frequency is generally greater than about 500 kHz.

Figure 2:
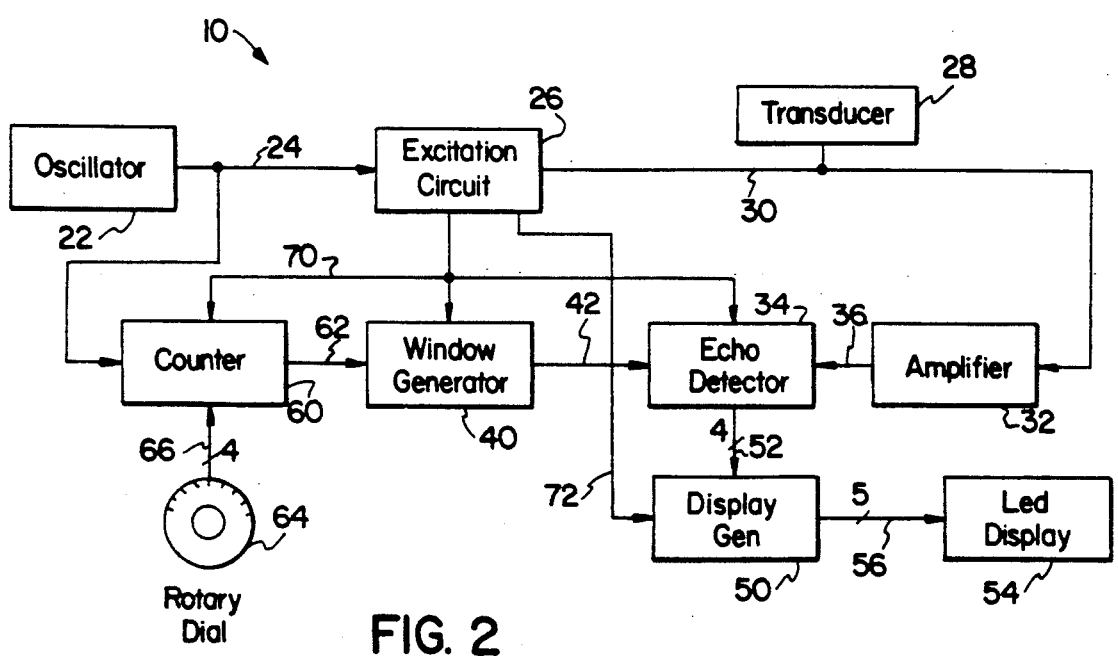
FIG. 2 is a block diagram of a preferred embodiment of a detector in accordance with the invention.

The transducer 28 is used with a detector 10, shown as a block diagram in FIG. 2, that may be provided at a remote location from the transducer 28. The detector utilizes an electronic window that defines the period of time, or time duration, that the detector 10 is responsive to the receipt of echoes from the transmitted energy burst. The electronic window has a fixed time duration, but the position of the window is adjustable in discrete increments to accommodate use of the detector 10 with pipes or containers of various sizes.

By way of example only, assume that the transit time of an energy burst from the transducer 28 to the pipe wall 12b and back is 20 milliseconds (ms). Since the detector would thus expect an echo at approximately 20 ms after the transmission of the energy burst (assuming there is liquid present), the electronic window might be "opened" at about 18 ms after transmission of the energy burst and "closed" after about 22 ms after transmission of the energy burst. Thus, the detector 10 would be responsive to any echoes received during the time duration between 18 and 22 ms after transmission. In this case, the position of the window would correspond to 20 ms after transmission and the width of the window would be 4 ms.

An important advantage of the detector 10 is that the position of the window is adjustable to accommodate pipes or containers of various sizes, and that the adjustment of the position of the window may be carried out by the operator, or user of the detector, in the field without having to use an oscilloscope or other electronic monitor to aid in the adjustment.

The basic operation of the detector 10 is as follows. The transducer 28 periodically transmits a burst of energy through the wall 12a towards the wall 12b. For each energy burst, the detector 10 determines whether an echo is received during the electronic window. If an echo is received, meaning that liquid is present at the point of attachment of the transducer 28 to the wall 12a, then the detector generates a liquidpresent signal. If no echo is received during the window, meaning that the energy burst has been greatly attenuated by its passing through air or another gas, then the detector concludes that no liquid is present.

A block diagram of the electronics of the detector 10 is shown in FIG. 2. An oscillator 22 provides a clock signal used at various points in the detector. The clock signal is provided via a line 24 to an excitation circuit 26, which generates a periodic electrical excitation signal that is supplied to a transducer 28 via a line 30. In response to the excitation signal, the transducer 28 generates and transmits through the container the periodic energy bursts.

Any vibrations sensed by the transducer 28, whether they are valid echoes, spurious echoes, or noise, are converted to an electrical received signal which is sent via the line 30 to an amplifier circuit 32, which amplifies and effectively filters the received signal. The amplifier 32 transmits the received signal to an echo detector 34 via a line 36.

The echo detector 34 determines whether a valid echo has been received. Two conditions must be satisfied for an echo to be considered valid. First, the echo signal must be received during the electronic window. This is accomplished by the connection of the echo detector 34 to a window generator 40 via a line 42. The window generator 40 enables the echo detector 34 so that the latter is responsive to echoes only during the time duration defined by the window. The second condition that must be satisfied is that the magnitude of the received signal must be of sufficient magnitude. This condition, which is accomplished by circuitry internal to the echo detector 34, is described in more detail below in connection with FIG. 3a.

Upon the detection of a valid echo, a relay or other switch (not shown) may be either energized or deenergized, depending upon the desire of the user. For example, upon the detection of liquid, the relay may activate a pump to reduce the level of liquid in the container.

The echo detector 34 is connected to a display generator 50 by four lines 52. The display generator 50 generates the necessary electrical signals to drive an LED display 54 and transmits them to the display 54 via five lines 56. As described in more detail below, the display 54 is used in the calibration of the detector to facilitate use of the detector with various pipes or containers.

The window generator 40 is coupled to a counter 60 via a line 62. The counter 60 is a countdown counter that controls the position of the window. The position of the window is determined by a rotary switch or dial 64 having 10 discrete switch settings. The position of the switch 64 determines the initial count of the counter 60. The switch 64, which is connected to the counter 60 via a line 66, may be provided on the outside of the detector 10, such as on the housing 68, or it may be provided inside the detector housing 68.

After an initial switch setting is selected by the operator, the counter 60 begins counting down from the selected initial count to zero upon being enabled by the excitation circuit 26 via a start-of-transmission, or transmit signal on a line 70. The transmit signal on the line 70 is activated upon transmission of each energy burst. Accordingly, variation of the initial count of the counter 60 acts to vary the time required for the counter 60 to count to zero, and thus causes the position of the window to be varied since the window generator 40 is enabled upon the counter 60 counting down to zero.

The transmit signal on the line 70 is also provided to the window generator 40 and the echo detector 34 to reset each of those circuits. A complemented transmit signal is provided by the excitation circuit 26 to the display generator 50 via a line 72.

Figure 3A:
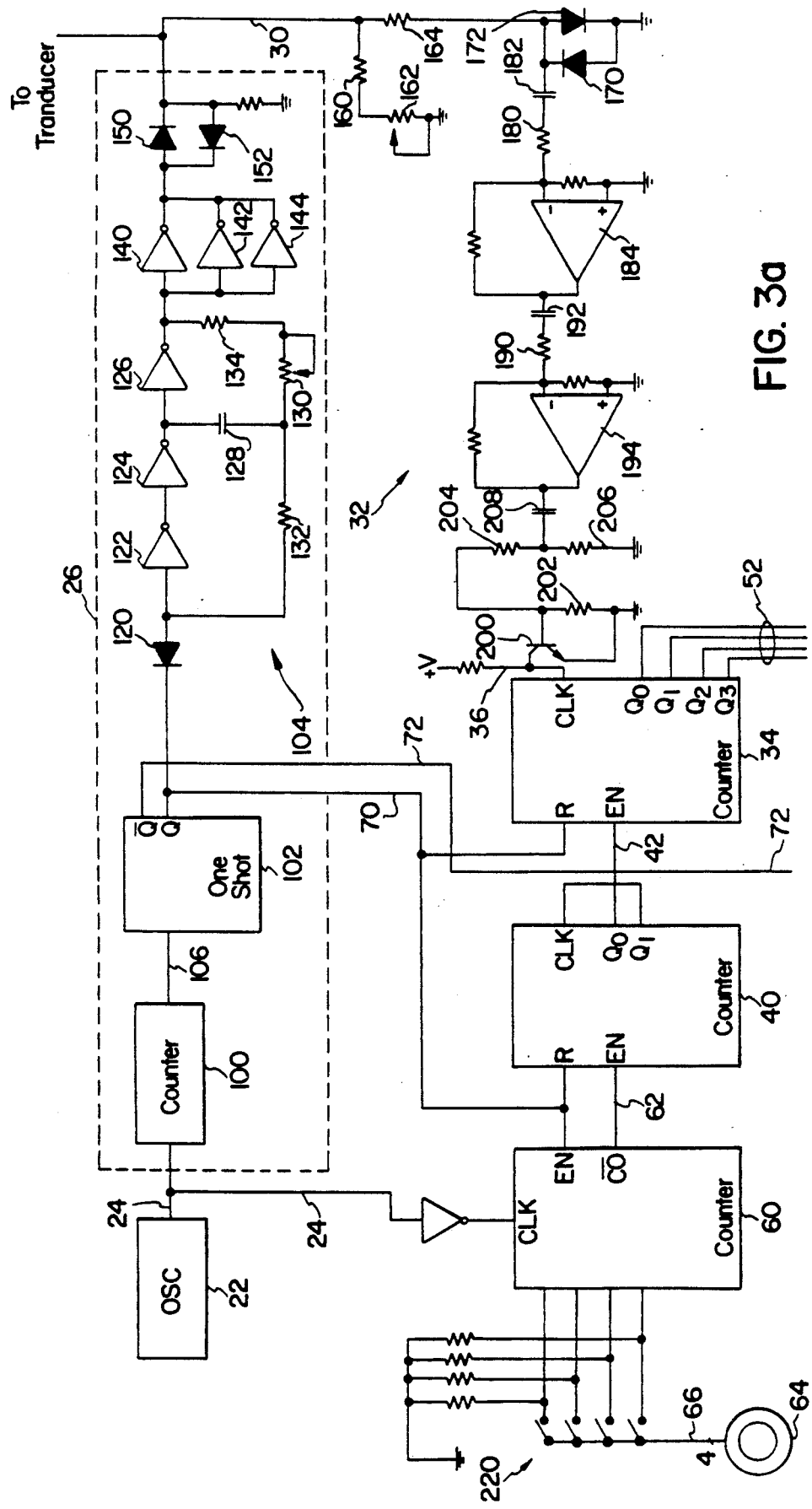
FIG. 3a is a circuit diagram of a first portion of the detector of FIG. 2.

A circuit diagram of a first portion of the detector 10 is shown in FIG. 3a. Referring to FIG. 3a, the excitation circuit 26, as indicated by the dotted box, comprises a counter 100, a monostable multivibrator, or one-shot 102, and an oscillator generally designated 104. The counter 100, which acts to divide down the frequency of the main clock signal generated by the oscillator 22, periodically generates a trigger pulse and transmits the trigger pulse to the one-shot 102 via a line 106. The trigger pulse causes the transmission of an energy burst.

When the trigger signal is received by the one-shot 102, the one-shot 102 generates a transmit signal which is output to the oscillator 104 via the line 70. As long as the transmit signal is active, the oscillator 104 generates a high-frequency electrical signal that is transmitted to the transducer 28, which then generates the energy burst therefrom. As explained above, the frequency of the high-frequency signal generated by the oscillator 104 is chosen such that the resultant energy burst is greatly attenuated in air but not greatly attenuated in liquid. This frequency, which is preferably greater than 500 kHz, may be in the frequency range between 1.5 MHz to 4 MHz, for example.

The oscillator 104, which is coupled to the output of the one-shot 102 via a diode 120, comprises three inverters 122, 124, 126 coupled to a capacitor 128, a potentiometer 130, and a pair of resistors 132, 134. The rate of oscillation of the oscillator 104 depends upon the time constant of the combination of the capacitor 128 and the resistive elements 130, 132, 134. The rate of oscillation may be advantageously adjusted by adjusting the potentiometer 130, as described in more detail below, so that an energy burst of a desired frequency is transmitted by the transducer 28. The oscillator 104 is coupled to a buffer comprising three parallel-connected inverters 140, 142, 144 which act as a driver for the transducer 28. The buffer generates a 7 or 8 volt excitation signal for the transducer 28. A pair of diodes 150, 152 prevent electrical noise from being transmitted to the transducer 28.

Figure 4:
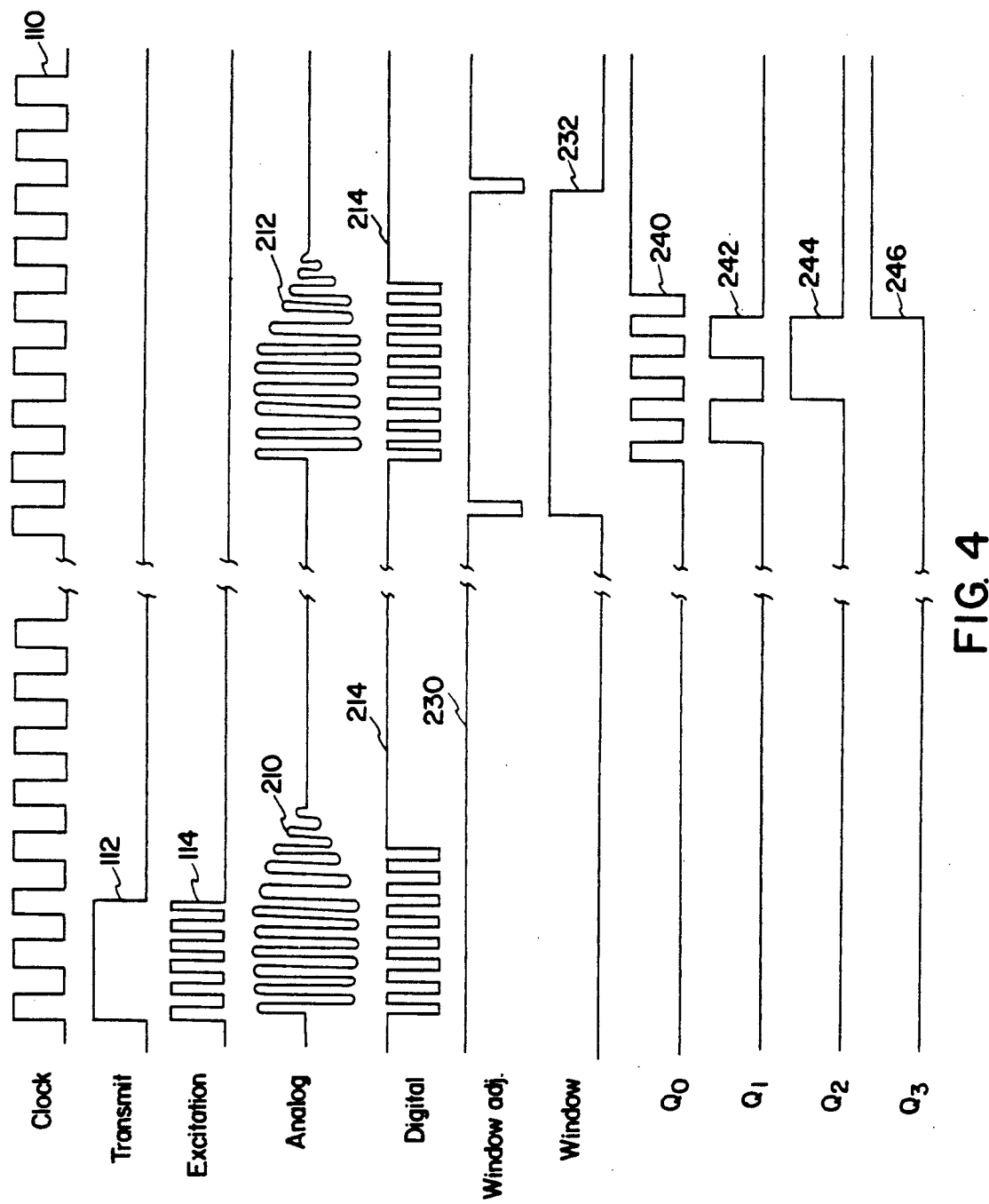
FIG. 4 is an illustration of various waveforms generated during operation of the detector of FIG. 2.

Referring to FIG. 4, the electrical signal waveforms just described are illustrated. The CLOCK signal 110 is the signal generated by the oscillator 22. The TRANSMIT signal 112 controls the duration of activation of the oscillator 104 that generates the EXCITATION signal 114 that causes the transducer 28 to transmit the energy burst.

It should be appreciated that the waveforms of FIG. 4 are representative and intended only to aid in the understanding of the operation of the detector and may not reflect the actual shape of the electrical signals generated in every circumstance.

Referring back to FIG. 3a, the transducer 28 generates an electrical signal representing the vibrations sensed by the transducer 28 and transmits this signal to the amplifier 32 via the line 30. The transducer 28 is a conventional transducer such as a Model 491 noninvasive sensor commercially available from Magnetrol/Introtek of Deer Park, N.Y. The received signal is supplied to the junction of a resistor 164 and the series combination of a resistor 160 and a potentiometer 162.

As described in more detail below, the magnitude of the received echo signal may be controlled by adjusting the potentiometer 162. If the potentiometer 162 is rotated so that its resistive value is relatively small, the strength or magnitude of the received echo signal will be relatively weak since a greater portion of it will be shunted to ground via the potentiometer 162. If the potentiometer 162 is rotated so that its resistive value is relatively large, the magnitude of the received echo signal will be relatively large since a smaller portion of it will be shunted to ground via the potentiometer 162.

The amplifier circuit 32 also includes a clamp circuit comprising a pair of diodes 170, 172 that clamp the amplitude of the received signal to ±0.7 volts. Since the received signal amplitude corresponding to an echo is approximately 1-200 millivolts, the clamp circuit does not interfere with the detection of echoes.

The clamp circuit is connected to a high-pass filter comprising a resistor 180 and a capacitor 182. The output of the high-pass filter is supplied to a first conventional amplifier stage having an amplifier 184 and associated biasing circuitry. The output of the amplifier 184 is supplied to a second high-pass filter comprising a resistor 190 and a capacitor 192. The second high pass filter is connected to a second amplifier stage comprising an amplifier 194 and associated biasing circuitry.

The output of the amplifier 194 is connected to a transistor circuit including a transistor 200, three resistors 202, 204, 206, and a capacitor 208. The transistor 200 generates a negative-going pulse for each positive pulse of the received signal.

Referring to FIG. 4, the received signal as developed at the junction of the resistors 204 and 206 is shown as the ANALOG signal, which has a first portion 210 caused by the EXCITATION signal 114 and a second portion 212 corresponding to the received signal representing an echo. As explained above, the first portion 210 is outside the window and ignored for echo detection purposes.

The digital signal generated by the transistor 200 is shown as the DIGITAL signal 214 in FIG. 4. The DIGITAL signal 214 generally corresponds to the ANALOG signal portions 210, 212, except that the former is more uniform and somewhat shorter in number of pulses. It might be noted that both the ANALOG and DIGITAL signals have more pulses than the EXCITATION signal 114. This is due to a well-known phenomenon referred to as transducer ring-down.

The position of the electronic window is controlled by the counter 60 and an associated switch network 220 comprising four switches and four resistors. The counter 60 is a down counter, and the switch network 220 generates an initial count from which the counter 60 counts down. The initial count, which may have 16 values, is adjusted by the setting of the rotary switch or dial 64. The rate at which the counter 60 counts down is determined by the frequency of the signal supplied from the oscillator 22 via the line 24. The counter 60 may be an MC14029 commercially available from Motorola.

When the counter 60 counts down to zero, it generates an output, or window position adjust signal, on the line 62 that is supplied to the window generator 40, which is also a counter. The counter 40 behaves like a monostable multivibrator, or one-shot. Thus, when the window position adjust signal is transmitted to the enable input of the counter 40, the counter 40 output on $Q_0$ goes high for a predetermined period of time, which corresponds to the duration of the window. This duration may be 200–250 microseconds ($\mu s$), for example. The echo detector 34 will be responsive to echoes only during this predetermined period of time. The counter 40 may be an MC14520 commercially available from Motorola.

Figure 5:
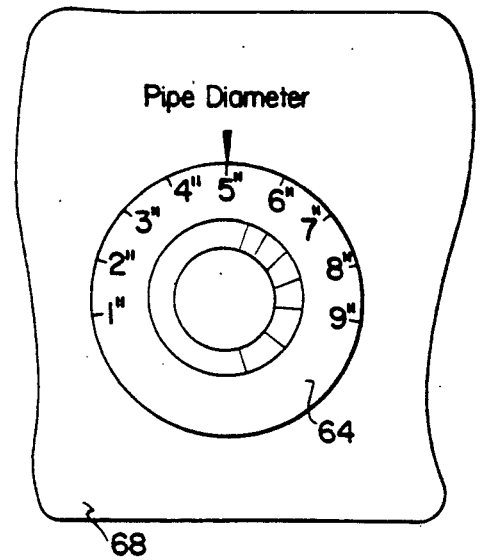
FIG. 5 is an illustration of a rotary dial schematically shown in FIG. 2.

The rotary switch 64 is illustrated in more detail in FIG. 5. The switch 64, which may be provided on the exterior of the detector housing 68, may include a nine-setting dial, each of the discrete dial settings being marked with a respective container size, such as a pipe diameter. The switch 64, which is shown in FIG. 5 set to correspond to a pipe diameter of 5" (five inches), may be calibrated in one inch increments from 1" to 9". The discrete increments of the switch could correspond to ½" pipe diameter increments or some other convenient increment scale. The increment scale could be changed, for example, by changing the frequency of the signal supplied to the clock input of the count-down counter 60.

The switch 64 could be implemented in any number of various ways, such as a plurality of digital switches or a binary-coded decimal (BCD) switch for example, and could be provided either inside the detector housing or on the exterior of the detector housing. It is only necessary that the switch have switch settings representing pipe or container sizes. The switch could be provided with numbers only, and a chart could be provided to correlate the switch numbers to the pipe diameters, for example.

Referring to FIG. 4, the WINDOW ADJUST signal generated by the counter 60 is shown as waveform 230, and the WINDOW signal generated by the counter 40 is shown as the waveform 232. As can be seen, the WINDOW signal generally corresponds to the anticipated time of arrival of the received echo signal as represented by the ANALOG signal portion 212.

The echo detector 34 determines whether a valid echo is received during the window by counting the number of pulses in the received echo signal. It has been recognized that the strength of a received echo signal is generally proportional to the number of pulses in the received echo signal. Referring to FIG. 4, a strong echo is shown to have nine negative-going pulses in the received signal 214. A weaker received signal would have less than nine such pulses, such as two or three pulses for example. The echo detector 34 recognizes a valid echo signal only if the received echo signal has a minimum number of such pulses, such as eight pulses for example.

Referring to FIG. 3a, the echo detector 34 comprises a counter 34 which receives on its enable input the window signal from the window generator 40 via the line 42 and the received echo signal on its clock input from the transistor 200 via the line 36. The counter 34 counts the number of pulses in the received signal while it is enabled by the window signal and generates four outputs, $Q_0$–$Q_3$, representing the binary count of the number of pulses in the received echo signal, where $Q_3$ is the most significant bit in the count and $Q_0$ is the least significant bit in the count. The counter 34 may be an MC14520 commercially available from Motorola.

Referring to FIG. 4, the outputs $Q_0$–$Q_3$ are shown as waveforms 240, 242, 244, 246, respectively. As can be seen in FIG. 4, each falling edge of the RECEIVER signal 214 causes the $Q_0$ signal to change state. The remaining signals $Q_1$ to $Q_3$ change state like ordinary counter outputs.

Figure 3B:
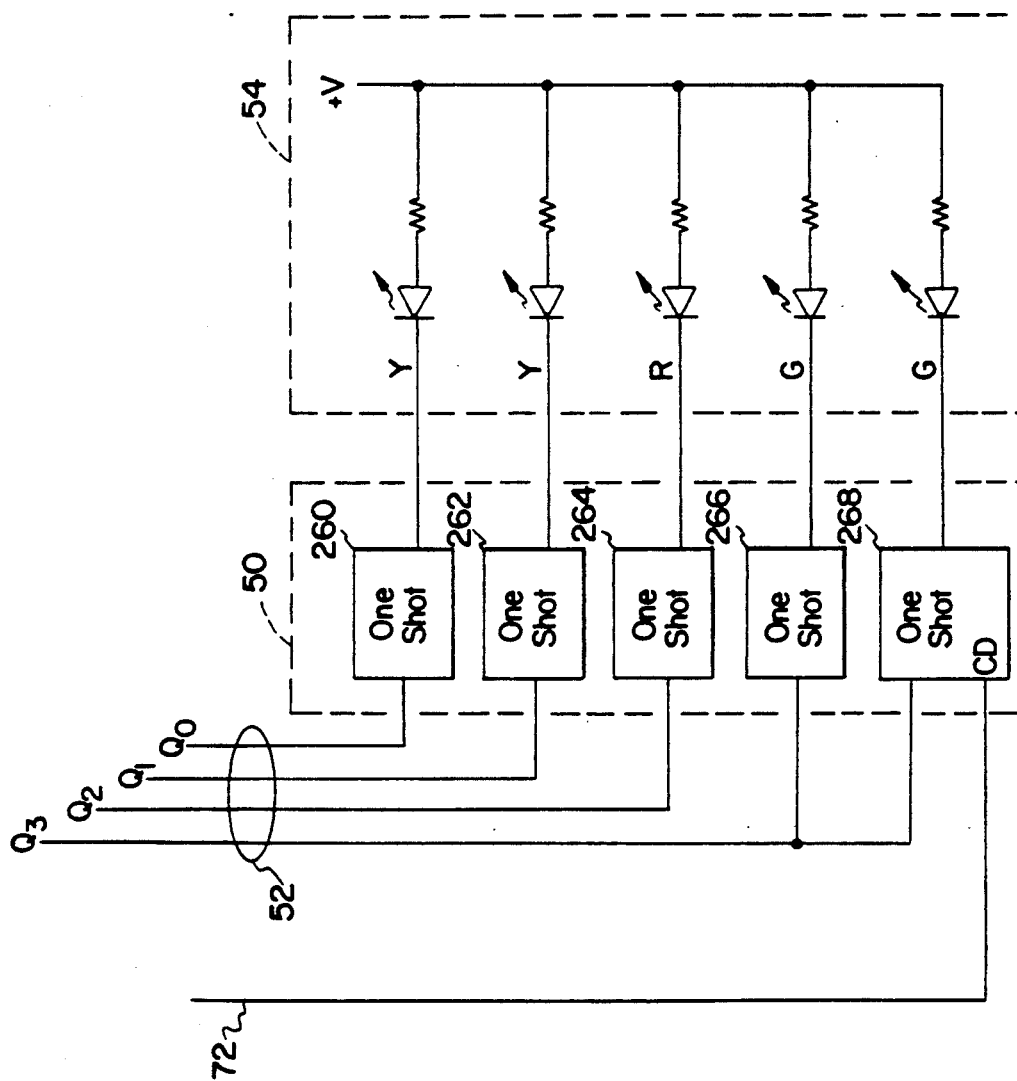
FIG. 3b is a circuit diagram of a second portion of the detector of FIG. 2.

Now referring to FIG. 3b, the $Q_0$–$Q_3$ signals are provided to the display generator 50 via the lines 52. Each of the $Q_0$, $Q_1$, and $Q_2$ signals is provided to a respective one-shot 260, 262, and 264. The $Q_3$ signal is provided to two one-shots 266 and 268. The one-shot 268 also receives on its clear direct (CD) input the complement of the transmit signal via the line 72. Each of the one-shots is coupled to a respective light-emitting diode (LED) of the LED display 54, the one-shots 260, 262 being connected to yellow LEDs, the one-shot 264 being connected to a red LED, and the one-shots 266, 268 being connected to green LEDs. The LED display 54 is provided integrally with the detector 10, meaning that it is part of the detector, being provided on the exterior of the detector housing 68 for example, and not as a separate unit or display.

In response to a positive-going signal, each of the one-shots 260–266 provides a high output signal lasting a predetermined period of time sufficient to illuminate the LED to which the one-shot is connected. The predetermined period that each one shot is turn on may take into account the rate at which bursts of energy are generated by the transducer 28 so as to provide an apparently constant illumination of the LEDs.

The one-shot 268 is triggered on the negative edge of the $Q_3$ output of the counter 34 so as to cause it to trigger later than the one-shot 266, which is also connected to receive the same $Q_3$ output but which is triggered by the positive-going edge of that signal. The one-shot 268 may be an MC14528 commercially available from Motorola.

In operation of the detector, the green LEDs when lighted indicate the reception of a received echo signal having the strongest magnitude since the green LEDs are connected to the most significant bit output from the counter 34. The illumination of only the yellow LEDs indicate the reception of a relatively weak echo signal since the yellow LEDs are connected to the two least significant bits output from the counter 34. As described in more detail below, the illumination of the LEDs is used in a tuning procedure that accommodates for differences between containers for which the detector is used.

The output of the one-shot 264, which is connected to the $Q_2$ output of the counter 34, generates the valid echo detect signal and may be used to drive a conventional relay (not shown) via a conventional relay driver circuit (not shown). The relay may be used, for example, to turn on a pump or to activate a remote alarm when liquid is detected. The trip sensitivity of the relay could be adjusted by connecting the relay to other outputs of the counter 34 such as the $Q_3$ output for example.

Detector Tuning Procedure

Upon attachment of the detector 10 to a pipe or other container, the detector is manually tuned to optimize its operation. This tuning includes adjusting the frequency at which the energy bursts are transmitted by adjusting the potentiometer 130 of the oscillator 104 and adjusting the strength, or magnitude, of the received signal by adjusting the potentiometer 162. The tuning of the detector advantageously allows the detector to be used on pipes of various diameters and compositions and with various liquids inside the pipes. This tuning also facilitates the detector 10 being made portable so that one such detector can be used to quickly determine whether there is liquid present in a plurality of pipes or containers.

One part of the tuning procedure involves setting the transducer excitation signal to its optimum frequency. A transducer has one or more frequencies at which it most efficiently couples mechanical vibrations into the wall of a container. Although the most efficient frequency depends on the material of the pipe and the liquid contained therein, a primary factor is the transducer itself.

The particular tuning procedure in accordance with the preferred embodiment depends on whether the transducer 28 is used with a metal or plastic pipe. If the pipe or other container has metal sidewalls, then the tuning procedure is performed when there is no liquid present at the point of attachment of the detector to the pipe.

For pipes of materials other than metal or plastic, the tuning procedure for metal containers as described below is used.

The tuning procedure for the detector when used with a metal container is as follows. Initially, the transducer 28 is attached to the metal container, and the potentiometer 130, hereinafter referred to as the "frequency potentiometer," is adjusted so that the frequency is at its lowest. For example, if adjustment of the frequency potentiometer allows the frequency to vary between 1.5 MHz and 4 MHz, this initial frequency would be 1.5 MHz. Also, the potentiometer 162, hereinafter referred to as the "magnitude potentiometer," is set so its resistive value is the smallest, such that the magnitude of the received echo signal is at its smallest, or weakest. The dial 64 is also positioned to correspond to the diameter of the pipe to which the transducer 28 is attached.

Then, with air (or another gas) at the point of attachment of the transducer 28, the frequency of the excitation signal is gradually increased, by turning the potentiometer, until all five LEDs of the display 56 are lighted.

It should be pointed out that, since the transducer frequency at this point is greatly attenuated in air, the illumination of the LEDs is not due to the reception of an echo travelling through air from directly across the pipe. In contrast, the illumination of the LEDs at this point is due to travel of the energy burst around the circumference of the metal pipe several times. The travel speed of the energy burst within the metal circumference will be much greater than the through-air path directly across the pipe. Thus, if the energy burst is strong enough to travel around the circumference of the pipe several times, it will fall within the electronic window and thus light the LEDs.

Although the travel of the energy burst around the circumference of the metal pipe wall is undesirable in the normal operation of the detector, the inventor has recognized that that can be useful to optimally set the transducer frequency during the tuning procedure. Thus, the illumination of the five LEDs, even though representative of travel of the energy burst within the metal pipe, nevertheless indicates a very efficient transfer of mechanical transducer vibrations into the pipe wall.

Although an efficient frequency is indicated by illumination of the five LEDs, this frequency is of course unacceptable since echoes generated by the energy burst travelling around the circumference of the pipe are being received within the window. Accordingly, the transducer frequency is again increased, by again turning the frequency potentiometer, until none of the five of the LEDs is illuminated, and then the frequency is increased by a further amount, such as a ¼ or ½ potentiometer turn for example.

As a result of the above adjustments, the optimal frequency will be close to the most efficient frequency for coupling vibrations into the pipe, but it will not be so great as to cause an energy burst to make multiple trips through the circumference of the pipe so that it falls within the window and is interpreted incorrectly as a valid echo. The final ¼ or ½ potentiometer turn is used as a safety factor.

When performed in connection with plastic pipes, the frequency tuning procedure is as follows. Initially, the frequency potentiometer is turned so that the lowest excitation signal frequency is provided. The magnitude potentiometer is turned so that the weakest-magnitude received signal is provided, and the switch 64 is adjusted to compensate for the diameter of the pipe. Then with liquid at the point of attachment of the transducer to the plastic pipe, the frequency is increased, by turning the frequency potentiometer, until all five LEDs are lighted.

It should be noted that since the plastic-pipe frequency tuning procedure is performed with the plastic pipe full of liquid, the lighting of the LEDs represents the receipt of an echo that travelled directly through the liquid in the pipe, and not one that travelled about the circumference of the pipe walls.

As a result of this adjustment, the coupling of the transducer vibrations into the plastic pipe wall is optimized. No additional adjustment of the frequency potentiometer is necessary.

The frequency tuning procedure just described for plastic pipes is different than that for metal pipes due to the nature of the interface between the pipe and the liquid within the pipe. For a metal-liquid interface, a significant amount of the energy burst is reflected by the interface, resulting in energy being injected around the circumference of the metal pipe. However, for a plastic-liquid interface, most of the energy is transmitted into the liquid, with little energy being reflected by the interface. As a result, plastic pipes generally do not generate spurious echoes due to circumferential travel around the pipe.

In the frequency tuning procedures described above, the optimal frequency could be obtained by starting with a relatively high frequency and reducing the frequency until the optimal frequency was located.

A second part of the tuning procedure, preferably carried out after the completion of the first part described above, optimally adjusts the magnitude of the received signal by adjustment of the magnitude potentiometer. This part of the tuning procedure, which is the same for both metal and plastic pipes, maximizes the magnitude of the received signal without making it so large that echoes which travel about the circumference of a pipe (usually metal) several times are made strong enough to occur within the electronic window.

At the beginning of this part of the tuning procedure, the magnitude potentiometer will remain in the position that provides the weakest received signal. The frequency potentiometer and dial 64 will remain as previously set during the execution of the frequency-tuning procedure.

With air present at the point of attachment of the transducer 28 to the container, the magnitude of the received signal is gradually increased, by turning the magnitude potentiometer, until one of the LEDs is lighted. If one of the LEDs becomes lighted, then the magnitude potentiometer is turned in the other direction to decrease the magnitude of the received signal until no LEDs are lighted. Finally, the potentiometer is turned an additional ¼ to ½ turn to decrease the magnitude of the received signal by a further amount.

In the above amplitude-adjusting procedure, it should be noted that since air is present in the container, any lighting of the LEDs will be the result of travel of the energy burst through the circumference of the container several times. As explained above, since this is not likely with a plastic container, in the execution of the above magnitude-adjusting procedure the operator will simply turn the magnitude potentiometer to generate the strongest received echo signal.

When the magnitude-adjusting procedure is performed with a metal pipe, increasing the magnitude of the received signal may cause one of the LEDs to become illuminated. This is undesirable since the illumination of the LEDs will be the result of travel of the energy burst around the circumference of the container several times. This is remedied by the above procedure since, if any LEDs become illuminated, the magnitude potentiometer is turned so as to reduce the magnitude of the received echo signal until the LEDs turn off. The final ¼ to ½ turn of the potentiometer is a safety factor.

In addition to the above tuning procedures, the position of the window could be adjusted based upon the output of the LEDs. This procedure would be useful, for example, if the specific pipe dimensions were not known, or if pipe-diameter size information was not provided to correlate the settings of the window position switch to associated pipe diameters.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A method of determining the presence or absence of an ultrasonically conductive medium within a container comprising the steps of:
   (a) providing information relating to the size of a container;
   (b) adjusting the position of an electronic window of a predetermined duration based upon the information provided in said step (a), the electronic window being associated with the travel time of a burst of energy through the container;
   (c) transmitting a burst of energy towards an opposing wall of the container; and
   (d) detecting whether said ultrasonically conductive medium is present in the container by responding to the receipt of an echo from said burst of energy only during the time duration determined by the electronic window,
   wherein said information comprises a respective container size for each of a plurality of discrete settings of a switch that controls the position of the electronic window.

2. A method as defined in claim 1 wherein said travel time of a burst of energy through the container is the round-trip travel time of said burst of energy.

3. A method as defined in claim 1 wherein said burst of energy has a frequency such that said burst of energy is substantially attenuated when transmitted in air but not substantially attenuated when transmitted in said ultrasonically conductive medium.

4. A method as defined in claim 1 wherein said ultrasonically conductive medium comprises liquid.

5. A method of determining the presence or absence of an ultrasonically conductive medium within a container comprising the steps of:
   (a) providing information relating to the size of a container, said information including a respective container size for each of a plurality of discrete settings of a switch that controls the position of an electronic window associated with the travel time of a burst of energy through the container;
   b) adjusting the position of the electronic window based upon the information provided in said step (a);
   (c) transmitting a burst of energy towards an opposing wall of the container, said burst of energy having a frequency such that said burst of energy is substantially attenuated when transmitted in air but not substantially attenuated when transmitted in said ultrasonically conductive medium; and
   (d) detecting whether said ultrasonically conductive medium is present in the container by responding to the receipt of an echo from said burst of energy only during the time duration determined by the electronic window.

6. A method of determining the presence or absence of an ultrasonically conductive medium within a container comprising the steps of:
   (a) providing information relating to the size of a container, said information including a respective container size for each of at least five discrete settings of a switch that controls the position of an electronic window associated with the round-trip travel time of a burst of energy through the container;
   (b) adjusting the position of the electronic window based upon the information provided in said step (a);
   (c) transmitting a burst of energy through a first wall of the container towards an opposing wall of the container, said burst of energy having a frequency such that said burst of energy is substantially attenuated when transmitted in air but not substantially attenuated when transmitted in said ultrasonically conductive medium; and
   (d) detecting whether said ultrasonically conductive medium is present in the container by responding to the receipt of an echo from said burst of energy only during the time duration determined by the electronic window.

7. A method of determining the presence or absence of an ultrasonically conductive medium within a container comprising the steps of:
   (a) providing information relating to the size of a container, said information including a respective container size for each of at least five discrete settings of a switch that controls the position of an electronic window associated with the round-trip travel time of a burst of energy through the container;
   (b) adjusting the position of the electronic window based upon the information provided in said step (a);
   (c) transmitting a burst of energy through a first wall of the container towards an opposing wall of the container, said burst of energy comprising a predetermined number of pulses and having a frequency such that said burst of energy is substantially attenuated when transmitted in air but not substantially attenuated when transmitted in said ultrasonically conductive medium;
   (d) detecting whether said ultrasonically conductive medium is present in the container by responding to the receipt of an echo from said burst of energy only during the time duration determined by the electronic window;
   (e) counting the number of pulses in said echo that are received during said step (d); and
   (f) selectively activating a visual display in response to the number of echo pulses that were counted during said step (e).

8. A detector that detects the presence or absence of an ultrasonically conductive medium in a container, said detector comprising:
   a transducer that transmits a burst of energy through the container;
   a window generator that generates an electronic window associated with the travel time of said burst of energy through said container;
   an echo detector coupled to said window generator that is responsive to an echo of said burst of energy only during the time duration determined by said electronic window; and
   a switch having a plurality of discrete settings for adjusting the position of said electronic window to one of a plurality of different positions, each of said settings of said switch being based on a respective size of a container.

9. A detector as defined in claim 8 wherein the travel time of said burst of energy is the round-trip travel time.

10. A detector as defined in claim 8 wherein said burst of energy has a frequency such that said burst of energy is substantially attenuated when transmitted in air but not substantially attenuated when transmitted in an ultrasonically conductive medium.

11. A detector as defined in claim 8 wherein said switch is a rotary switch having at least five discrete settings.

12. A method of determining the presence or absence of an ultrasonically conductive medium within a container with the use of a detector, said method comprising the steps of:
   (a) providing an electronic window associated with the travel time of a burst of energy through the interior of the container;
   (b) transmitting a burst of energy towards an opposing wall of the container;
   (c) detecting whether said ultrasonically conductive medium is present in the container by responding to the receipt of an echo from said burst of energy only during the time duration determined by the electronic window;
   (d) providing a visual display for generating a visual indication relating to the magnitude of said echo, said visual display being provided integrally with said detector; and
   (e) adjusting the position of the window based upon the presence or absence of a visual indication generated by said visual display.

13. A method of determining the presence or absence of an ultrasonically conductive medium within a container with the use of a detector, said method comprising the steps of:
   (a) providing an electronic window associated with the travel time of a burst of energy through the interior of the container, said window being provided in a first position;
   (b) transmitting a burst of energy through the interior of the container towards an opposing wall of the container;
   (c) detecting whether said ultrasonically conductive medium is present in the container by responding to the receipt of an echo from said burst of energy only during the time duration determined by the electronic window when the window is in said first position;
   (d) providing a visual display for generating a visual indication relating to the magnitude of an echo of a burst of energy transmitted during said step (b); and
   (e) changing the position of the window from said first position to a second position based upon the presence or absence of said visual indication generated by said visual display.

14. A method as defined in claim 13 wherein the position of the window is changed to said second position during said step (e) when no visual indication is generated.

15. An apparatus, comprising:
   a transducer that transmits a burst of energy through the interior of a container;
   a window generator that generates an electronic window of a predetermined duration associated with the travel time of said burst of energy through the interior of the container;
   an echo detector coupled to said window generator that is responsive to an echo of said burst of energy only during the time duration determined by said electronic window;
   a visual display that generates a visual indication relating to the magnitude of said echo; and
   a switch for adjusting the position of said electronic window to one of a plurality of different positions based upon the visual indication generated by said visual display.

* * * * *